United States Patent [19]
Gould

[11] Patent Number: 5,169,526
[45] Date of Patent: Dec. 8, 1992

[54] RAPIDLY DEPLOYABLE FLUID SPILL CONTAINMENT AND RECOVERY SYSTEM

[76] Inventor: William L. Gould, 30 Smith Rd., Sussex, N.J. 07461

[21] Appl. No.: 767,385

[22] Filed: Sep. 30, 1991

[51] Int. Cl.⁵ ............................................. E02B 15/04
[52] U.S. Cl. .................................. 210/242.3; 210/256; 210/923; 405/66
[58] Field of Search ...................... 210/242.3, 923, 256, 210/776; 405/63, 66, 70, 72

[56] References Cited

U.S. PATENT DOCUMENTS

| | | | |
|---|---|---|---|
| 3,221,884 | 12/1965 | Muller | 210/923 |
| 3,369,664 | 2/1968 | Dahan | 210/923 |
| 3,532,219 | 10/1970 | Valdespino | 210/923 |
| 3,756,294 | 9/1973 | Rainey | 210/923 |
| 3,966,614 | 6/1976 | Azers | 210/242.3 |
| 4,062,191 | 12/1977 | Preus | 210/923 |
| 4,068,478 | 1/1978 | Meyers et al. | 405/66 |
| 4,207,191 | 6/1980 | Webb | 210/923 |
| 4,295,755 | 10/1981 | Meyers | 405/63 |
| 4,752,393 | 6/1988 | Meyers | 210/242.3 |
| 4,988,438 | 1/1991 | Eddleman | 210/923 |

*Primary Examiner*—Stanley S. Silverman
*Assistant Examiner*—Christopher Upton
*Attorney, Agent, or Firm*—Jacob B. Burke

[57] ABSTRACT

This is a rapidly deployable system for containing, collecting and storing an oil or other fluid spill occurring in a body of water. A plurality of flexible, cylindrical boom sections with depending coplanar flexible skirts, are detachably connected end to end to form an elongated boom assembly which may be as much as 400 feet long, for surrounding the fluid spill in the water. Each of the boom sections has apertures along one side to admit fluid from the spill. Long coil springs in the boom sections maintain the sections in cylindrical form while permitting lateral flexing of the boom sections. Floating skimmers in the boom sections collect fluid entering the boom sections via the apertures. The skimmers pass the fluid to a flexible collector pipe in the boom sections. The collector pipe is connected to pumps in housings interposed in the boom assembly. Flexible skirts also depend from the pump housings. Removable collapsible storage tanks outside the boom sections are connected to the pumps to receive and store the collected fluid spill. The system can be disassembled, cleaned and stored for rapid reassembly and redeployment at a future fluid spill to begin containing, collecting and storing the fluid spill within a few hours. The entire system is buoyant and can be towed to a fluid spill.

4 Claims, 3 Drawing Sheets

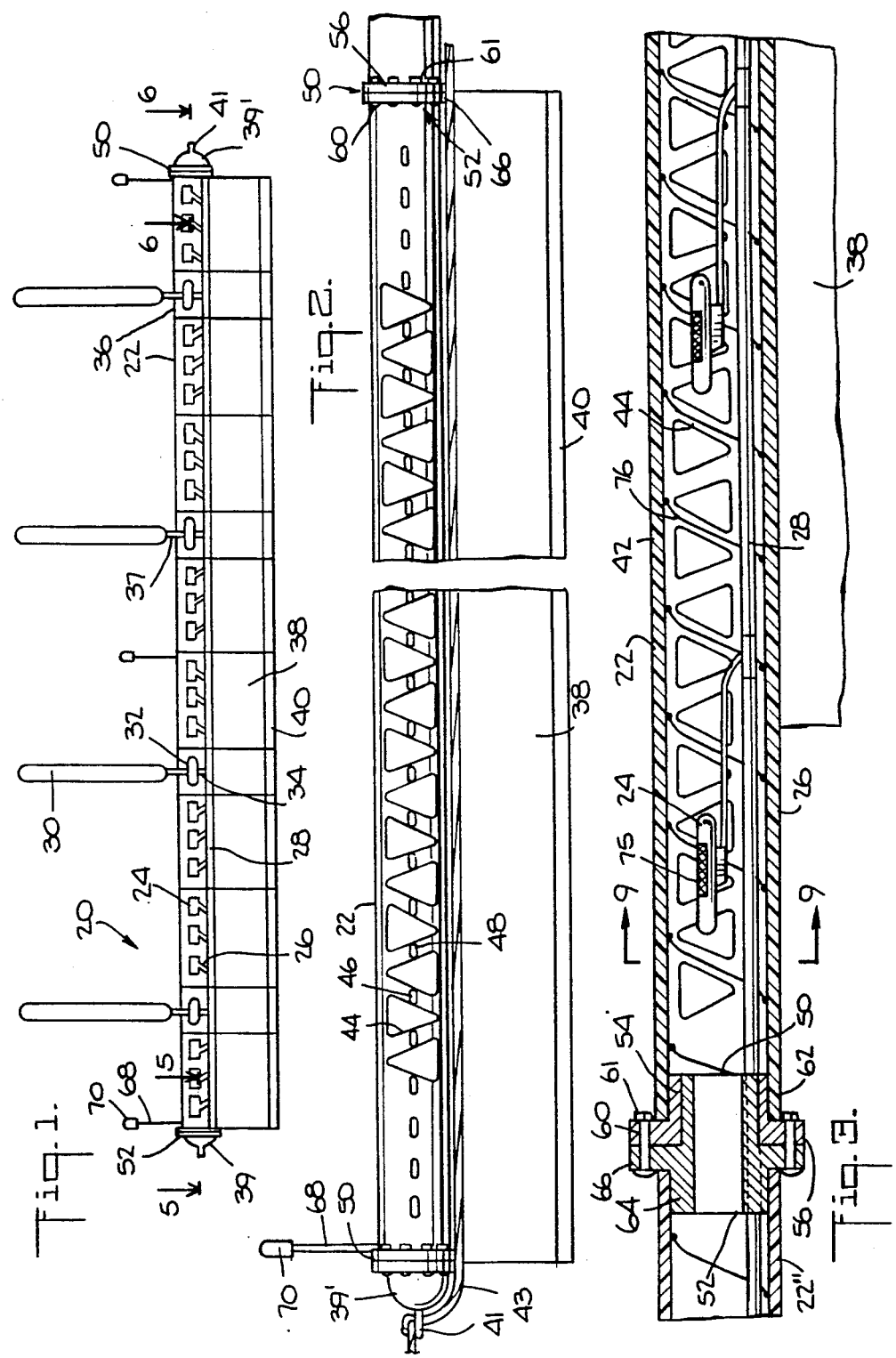

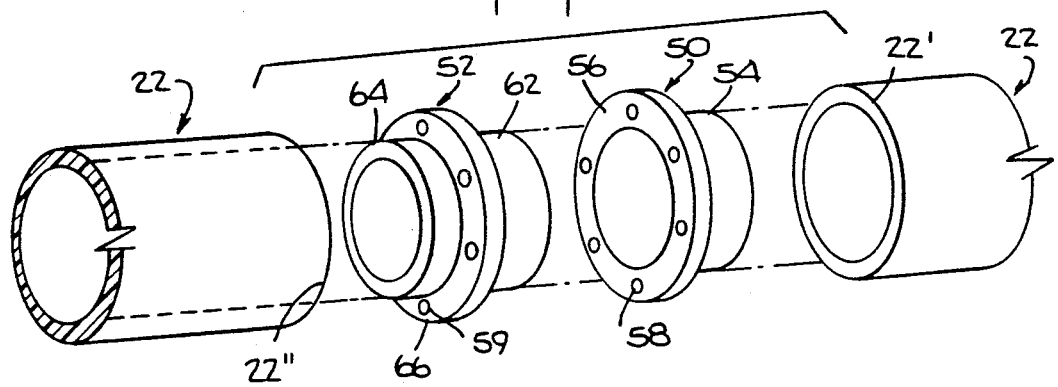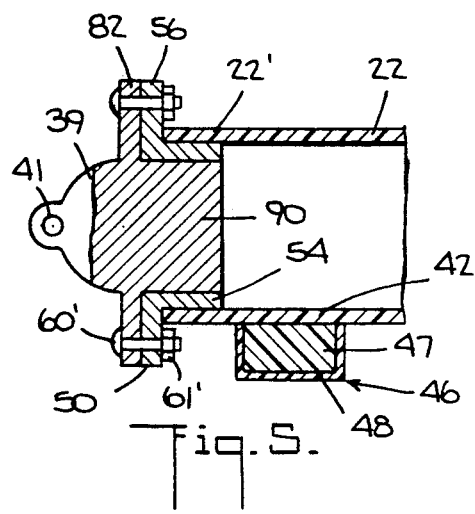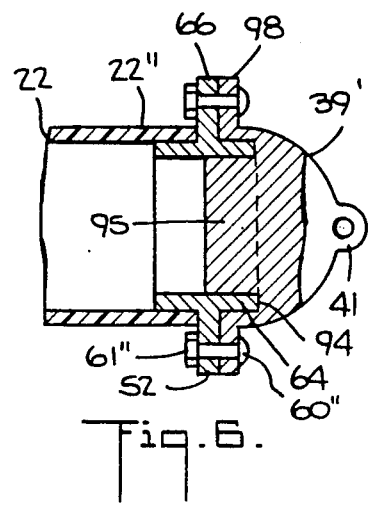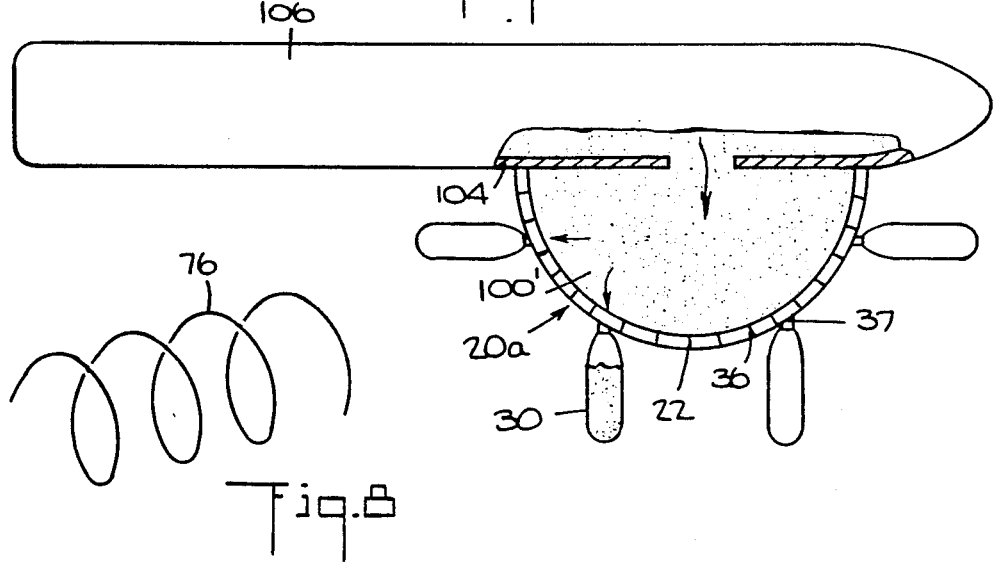

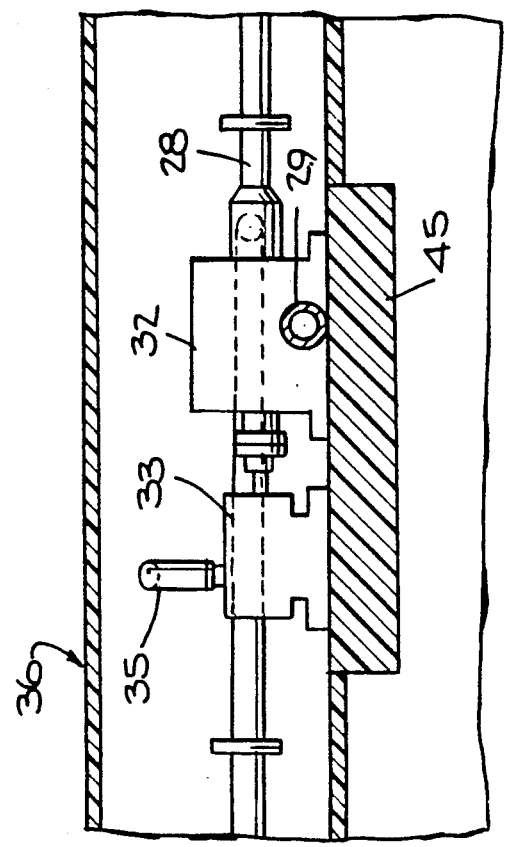
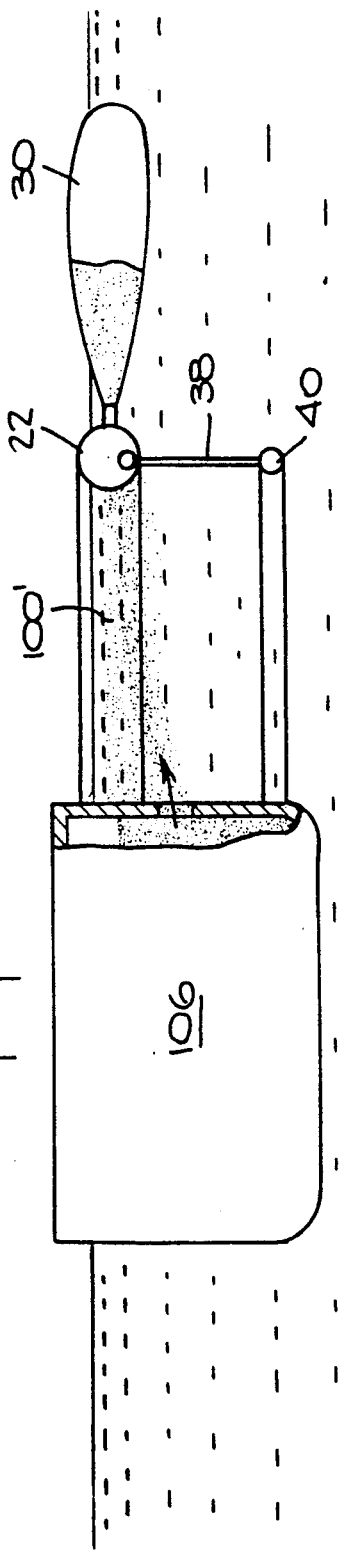
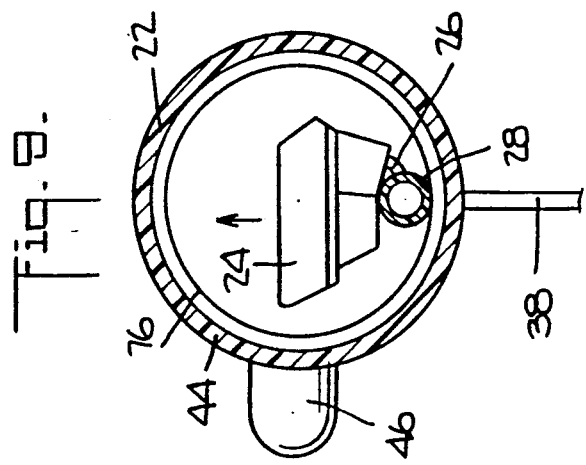

RAPIDLY DEPLOYABLE FLUID SPILL CONTAINMENT AND RECOVERY SYSTEM

BACKGROUND OF THE INVENTION

1. Field of the Invention

This invention relates to the art of oil spill containment and recovery systems, and more particularly concerns a self-contained or integrated oil spill containment and recovery system which is portable and allows any vessel, platform or other fluid spill source at a fluid spill site in water, the self-sufficient ability to rapidly deploy the system and efficiently contain and recover a spill, with greater controllability and enhanced effectiveness than prior spill containment and recovery systems.

2. Description of the Prior Art

In the event of an oil spill in a body of water, the oil disperses at a rate determined by the size of the leak, force of currents, wave size, and velocity of wind. The traditional method of spill response is to deploy "spill teams" from local or regional centers to effect containment and recovery. The proximity of the spill to the center, their vessels, equipment and manpower, plus their ability to rapidly mobilize and reach the spill site determines the spill's controllability. Generally, normal current, wave and wind conditions can disperse a spill far beyond containment and recovery in less than ninety minutes. The Congressional Office of Technology Assessment has reported a finding in 1990 that "it has been unusual for more than 10 to 15 percent of oil to be recovered from a large spill". Even with improved technology and response capability, the report predicts that less than half of a large spill will ever be recovered.

Current proposed new measures to deal with fluid spills include: double hulled tankers, increased numbers of spill response centers, and giant self-propelled ocean going skimmers. Of these, only the double hulled tanker offers some increased protection. It should be noted, however, that neither the recent Valdez nor the Huntington Beach accidents would have been prevented even if the hulls were doubled on their tankers.

A primary disadvantage of current methods and technology is their inability to rapidly and effectively contain and recover a spill before uncontrolled dispersal occurs, due to dependence upon response centers that must mobilize vessels, equipment and manpower, then journey to the spill site whereever it may be, contain the spill before uncontrolled dispersal occurs, and then recover the spilled oil before the effects of sunlight, water, temperature and turbulence create excessive difficulty for removal.

A secondary disadvantage is: the limitations of containment booms to effectively contain a spill in moderate sea conditions due to their required lightweight nature; the lack of skimming efficiency (ratio of fluid spilled to water collected) in moderate seas due to a skimmer's need to keep contact with the surface of the oil spill for undisturbed suction, and also the skimmer's need to operate in a thick build-up of spill fluid to insure high efficiency and rapid recovery.

A third disadvantage is the necessity for storing the recovered fluids. Since the skimming efficiency will be less in an uncontrolled environment such as a moderate sea, the oil to water ratio may be as low as 5% oil to 95% water. The storage facilities are overtaxed by water limiting useful storage of spill fluids collected, while the delay in time increases the spill's exposure to the environment and potentially adversely changes the fluid's composition and recoverability. In summary, current methods of spill response all but guarantee uncontrolled dispersal with potential environment disaster.

SUMMARY OF THE INVENTION

The present invention provides a system for overcoming the above mentioned and other difficulties and disadvantages of prior spill containment and recovery systems. The invention is directed at rapid containment and controlled efficient recovery and storage to increase the effectiveness of spill recovery, while offering significant assurance that accidents will not become disasters. The present system provides portable, self-contained spill containment and recovery apparatus for marine use which allows any vessel, platform or potential spill source the self-sufficient ability to rapidly and efficiently contain and recover a spill before it can become uncontrollable and unrecoverable.

The present system employs a novel boom assembly which acts both as a spill containment means and as a housing for oil recovery apparatus, with attached fluid storage facilities. The boom assembly is constructed of flexible, reinforced polymer which is nonporous, tough, and strong, to provide high oil, tear, and ultraviolet resistance. It is self-extinguishing in the event of fire. The material may have a nominal wall thickness as thin as 1.1 millimeters. Each section of the boom housing assembly has bonded PVC flanges at each end for connecting boom end to end together in axial alignment by bolts.

Within each boom section is an arrangement of automatic floating weir skimmers connected to a flexible collection pipe or line, with quick disconnect fittings at each end. The automatic floating skimmers allow for multiple skimmer use by their ability not to lose priming to the manifold in the event of starve-out or breaking contact with the oil surface.

The flexible collection line is fastened to the base of the boom sections by non-chafing woven nylon strapping. Within each of the boom sections is a helically coiled frame to retain the boom section's cylindrical shape without limiting its lateral flexibility. Outside each boom section are attached flotation pads to provide proper buoyancy to the boom sections in water.

To allow a spill to enter a boom for collection, a series of triangular holes or openings are provided in the inward or spill side of the sections for the boom assembly. Fastened to the bottom of the boom sections are flexible skirts or keels measuring 24 to 36 inches in width or depth, depending on specification requirements. The skirt or keel acts as both a stabilizer for the boom assembly and as a barrier to prevent a slick from spilling underneath in rough seas.

To operate the skimmers, pumps and motors to drive the pumps are housed in watertight sections termed "pump housings" which mate with the boom sections at their flanges and also connect externally to spill collection lines. The pump type preferred is a progressive cavity pump. This type of pump offers little if any, vibration. It does not create an emulsion when pumping an oil/water mixture, and provides a narrow profile to fit easily in the pump housing. The motor for each pump is preferably a pneumatic powered rotary piston or vane type connected through a gearbox, if required, to drive each pump.

To store the collected fluids, each pump discharges into a floating storage tank. The tanks are collapsible and towable. They may have storage capacities up to 100,000 U.S. gallons each. In the event of a huge spill, the tanks can be changed to others of larger capacity, or added to allow almost infinite storage capacity. The pump housing may be fabricated from reinforced polyvinyl chloride (PVC). All connections for air, suction and fluid discharge are disposed outside the boom assembly. A 24 to 36 inch skirt is attached to the pump housings similar to those attached to the boom housings.

The boom assembly is entirely buoyant to float in water. The entire structure is towable to a spill site as is without requiring a towing platform or other carrier. A tow line such as a kevlar cable of sufficient strength can be used to connect the boom assembly to a towing vessel, to sustain all tension loads, and to prevent stretching the boom assembly. When a boom assembly is being towed, the skirt can be used to cover the intake openings in the boom sections and the folded collapsible tanks. The skirt is fastened to the boom housing at the top at three foot intervals by a pin and eye fastener. Each pin is connected to a single cable which attaches to a pneumatic piston in the pump housing. When in position to begin recovery of the spill, compressed air is turned on and the piston pulls the cable which releases the pins. As the skirt bottom is weighted, gravity drops the skirt back into depending position in the water, to uncover the intake openings of the boom sections, and the folded tanks. Suitable eyes and couplings are provided at opposite ends of the boom assembly for attaching the tow line to enable the towing of the boom assembly to the spill site.

The above mentioned and other objects and many of the attendant advantages of this invention will be readily appreciated as the same become better understood by reference to the following detailed description when considered in connection with the accompanying drawings in which:

BRIEF DESCRIPTION OF THE DRAWINGS

FIG. 1 is a front elevational view, partially in axial section, and partially diagrammatic, showing basic parts of a system embodying the invention, including a boom assembly and pump housings.

FIG. 2 is a rear elevational view on an enlarged scale of a boom section with parts broken away, showing the apertured side which faces an oil spill.

FIG. 3 is an enlarged axial sectional view of parts of joined boom sections showing internal construction.

FIG. 4 is an enlarged exploded perspective view of parts of a joint assembly for two boom sections.

FIGS. 5 and 6 are enlarged fragmentary axial sectional views taken on lines 5—5 and 6—6 respectively of FIG. 1 showing tow line coupling members at opposite ends of the boom assembly.

FIG. 7 is a reduced plan view, partially diagrammatic and partially in horizontal section of a portable containment and recovery system embodying the invention, disposed at a hole in a vessel leaking oil.

FIG. 8 is an enlarged perspective view of part of a helical wire frame such as employed in each of the boom sections of a boom assembly.

FIG. 9 is an enlarged cross section taken on line 9—9 of FIG. 3.

FIG. 10 is a diagram showing components in a pump housing of the system.

FIG. 11 is an elevational view of the system shown in FIG. 7.

DESCRIPTION OF THE PREFERRED EMBODIMENT

Referring now to the drawings wherein like reference characters designate like or corresponding parts throughout, there is illustrated in FIG. 1 a diagrammatic representation of an assembly of parts in an oil spill containment and recovery system, according to the invention, designated generally by numeral 20. The system has a series of interconnected boom sections 22 which serve as housings for skimmers 24. Three skimmers are shown schematically in each boom section 22. Each skimmer 24 is connected by a flexible collection pipe or tube 26 to a main suction collection line 28. The system is provided with four fluid storage tanks 30. Each tank is detachably connected to a separate pump 32 which draws fluid from the collection line 28 by a storage feed pipe 34. Each pump 32 is contained in a closed housing 36 connected to ends of adjacent boom sections 22. The flexible collection line 28 runs through all the boom sections 22 and pump housings 36. The pump housings are described further below in connection with FIG. 10. The storage tanks 30, shown in FIG. 1 upright only for convenience in illustration, are flexible, collapsible fuel storage bladders. Maximum capacity of each tank 30 is about 40,000 U.S. gallons. At the bottom of each boom section 22 and pump housing 36 is a flexible skirt 38 provided with a weighted bottom edge 40. The boom sections 22 are constructed from nonporous, tough, strong, oil resistant plastic material such as reinforced polymer. The skirts 38 are made of the same material. At opposite ends of the boom assembly are tow line coupling members 39 and 39′ terminating in outwardly extending eyes 41 to which a tow line 43 can be connected as best shown in FIG. 2. Coupling members 39 and 39′ can be made of metal such as aluminum.

FIGS. 2 and 3 show parts of a boom section 22. FIG. 2 is an external rear elevational view of the side 42 which faces an oil spill. FIG. 3 is an internal axial sectional view. Side 42 is provided with a series of triangular holes 44 which serve as intake openings for the oil spill. A lateral line of floats 46 is shown in FIG. 2. These floats extend at spaced intervals for almost the entire length (about forty feet) of each boom section 22. Each float 46 has a core 47 made of closed cell foam plastic material covered by a nonporous cover or jacket 48 secured to side 42; see FIGS. 2 and 5. The floats serve as flotation means to give each boom section 22 sufficient buoyancy to float the several boom sections when immersed in water. The buoyancy of the boom assembly 20 makes it possible to tow the entire system to a spill site without using platforms or other carrier means for the boom assembly.

The boom sections 22 are cylindrical pipes each about forty feet long and about twenty inches in internal diameter. A female joint member 50 is fused to one end of each boom section. A male joint member 52 is fused to the opposite end of each boom section. As best shown in FIGS. 2-5, the female joint members 50 has a short nipple 54 which is inserted into an end 22′ of the boom section. The joint member 50 has a radial annular flange 56 provided with holes 58 which receive bolts 60. The male joint member 52 is fused to the other end 22″ of each boom section. It has a short nipple 62 which extends into the female section 50 and another axially aligned nipple 64 which extends into end 22' of the boom section. A radial annular flange 66 on the joint member 52 mates with an abuts the flange 56 on the adjoining boom section. The holes 59 in flange 66 register with holes 58 and receive bolts 60. Nuts 61 engage on the bolts to secure the boom sections together in axial alignment. If required navigation light poles 68 can be attached to the boom assembly at spaced points. Each light pole carries a lamp 70.

Inside each boom section as shown in FIGS. 3 and 9 are automatic floating weir skimmers 24. Each skimmer has an inlet 75 through which oil spill fluid enters the skimmer. The skimmer is under suction and delivers the fluid via a flexible connecting tube or pipe 26 to the flexible collection line 28 which is also under suction. The fluid collection line 28 delivers the fluid collected by the skimmers 24 to pumps 32 shown in FIGS. 1 and 10. The skimmers are buoyant and move up and down in the boom sections 22 in response to change in level of the oil spill surrounding the skimmers. At all times the inlet 75 of each skimmer remains just below the surface level of the fluid in the boom section for maximum efficiency in collecting the fluid spill.

In FIGS. 3, 8 and 9 is shown a frame in the form of a helical steel wire coil 76 which extends axially of each boom section 22 in abutment with the inside wall of the boom section under and around collection line 28. This frame or coil helps retain the cylindrical form of the boom section under all working conditions.

In FIGS. 1, 2, 5 and 6 are shown tow line coupling members 39 and 39' terminating in eyes 41 to engage tow line 43. The coupling members 39, 39' are connected the females and male joint members 50, 52 at opposite ends of the boom assembly 20. Coupling member 39 has a cylindrical plug 90 which extends axially into nipple 54. A radial annular flange 82 abuts flange 56 and is secured by bolts 60' and nuts 61'. This seals the left end of the boom assembly as viewed in FIGS. 1 and 5. Coupling member 39' fits into the male joint member 52 as best shown in FIG. 6. Plug 90 has a recess 94 which receives nipple 64. The coupling member 39' has a cylindrical flange 95 which fits into the joint member. Flange 95 is integral with a dome 96 and integral eye 41. Annular flange 98 is secured into abutment with flange 66 by bolts 60" and 61". This secures the coupling member to the right end of the boom assembly; see FIGS. 1 and 6.

FIGS. 7 and 11 show partially schematically and partially in horizontal section, one possible deployment of a portable containment and recovery system 20a for an oil spill, where oil 100 is flowing through a hole 102 in a wall 104 of a vessel 106. The boom assembly of system 20a is curved around the hole 102 and opposite ends of the boom assembly are secured in any suitable manner to the outer wall 104 of the vessel. The retained oil 100' flows into flexible, expansible storage tanks 30 connected at spaced intervals to pumps 32 in pump housings, best shown in FIG. 10. The perimeter of the boom assembly may be 400 feet in length with a radius of about 125 feet. The area of the fluid 100' enclosed may be about 25,000 square feet. The maximum volume of fluid retained by the boom assembly and by the four storage tanks may be about 480,000 U.S. gallons. This can be expanded to an emergency maximum volume of about 550,000 gallons. The confined oil 100' creates a back pressure at hole 102 which slows the flow of oil 100, and facilitates the making of emergency repairs at the hole.

FIG. 10 shows diagrammatically the disposition of components in a pump housing 36; see also FIG. 1. The pump housing 36 encloses a pump 32 driven by a pneumatic motor 33. The motor 33 has a compressed air inlet 35. The fluid collection line 28 is connected directly to pump 32 which has a discharge outlet 29 connected to inlet pipes 37 of a storage tank 30; see FIGS. 1 and 7. Foam flotation material 45 surrounds the pump housing 36 to support the motor 33 and pump 32 in the water. Skirt 38 retains the fluid spill within the area enclosed by the boom sections 22.

Generally, in the event of an oil spill, the system 20 can be deployed rapidly in several ways. From a vessel's deck the system can be lowered into the water, centered over the spill, tethered and activated by turning on the air supply to pumps 32. From the water, if the apparatus is in tow, the deployment will be similar except that the skirts which are drawn up over the intake openings of the boom sections and over the folded collapsible tanks will be released to drop down into the water. No towing platform is required to tow the system to a spill site because the entire system 20 is buoyant and floats in the water. The system's apparatus will initially act as a containment barrier allowing the spill to gain density. Once the spill has achieved a two to six inch depth, the pumps 32 will be activated by turning on their individual air supply. Compressed air to power the pumps will be supplied from either the vessel's air compressor or from a stand-by portable compressor. The air supply will be directed into a manifold with valves controlling the lines to each individual pump. When the oil leak is repaired or the fluid spill is exhausted, operations will cease and the floating storage tanks 30 will be uncoupled and towed to port for emptying. The tanks 30 can be cleaned for reuse, and the apparatus can be stored awaiting its next call for duty.

The present invention has self-contained features which simplify the treatment of an oil spill by reducing its technical requirements. The apparatus provides a total spill containment and recovery system that can be simply and rapidly deployed and operated. The function and focus of spill response centers can be directed to spill prevention, because vessels, carriers, drilling and pumping platforms have for the first time practical and dependable apparatus for self-sufficiently preventing and remedying their own spills with little or no uncontrolled oil or other fluid dispersal. The apparatus can be arranged to operate in ponds, lakes, rivers, streams and oceans, all of which demand rapid response to spills. The apparatus of the system can be stored at ports and harbors where it will be rapidly available for response to occurrence of an oil spill. The apparatus can accomodate the smallest to largest oil spills, and will operate with minimum attention and manpower after deployment.

As stated above, the system provides an immediate remedial response to an oil or other fluid spill at the site of the spill. It enhances the efficiency of the skimming operation by immediately allowing a controlled build-up of spill to allow a thick concentration of spilled fluid needed for maximum skimmer efficiency. An important feature of the invention is the placement of the skimmers within the boom sections to provide housings which moderate currents, winds and waves, and allow improved contact with the spill surface. By enhancing the efficiency of skimming, the apparatus has the potential to collect and store almost 100% of the spill. As a containment boom assembly, the system offers exceptional stability and spillover and spill-under prevention due to its weight and size, as compared with a conventional empty boom.

As previously mentioned, the system can be used in all water bourne applications. The system can be rapidly deployed from vessels, oil drilling or pumping platforms, or at shore sites. The apparatus can be to a spill site or to a towing vessel, and can then accompany the vessel in tow. The system can also be used in other applications such as in the cleanup of algae and other water pollutants.

The principal characteristics of the present invention which allow it to perform successfully are as follows:

Conventional empty booms have noted limitations in their ability to contain an oil spill. Skimmer vessels are slow, inefficient, and lack sufficient storage facilities. All conventional spill response systems are designed to operate the containment and recovery equipment which is always too far from a remote spill site to reach it in time to prevent an accident or disaster. The current trend to spend big money on big solutions for big spills does nothing to increase response time. It only admits to addressing the fact that current solutions are designed to cope with uncontrolled spills. Preventing the spread of oil spills has been regarded as not possible because all shore based response centers have no possibility of rapid deployment. The present invention by contrast, is portable, self-contained and can be deployed from any vessel, barge, platform or shore to immediately contain, recover and store spilled fluid in a safe, highly efficient manner. As a boom assembly for containment of spills, the self-contained system prevents fluid build-up from passing by the boom assembly, collecting the spill and storing the fluid beyond the containment area. Adverse conditions are buffered by the weight of the boom sections and their flexibility, while fluids attempting to pass over the boom pass into the boom sections and are collected.

The present apparatus as a spill recovery system enhances the collection of a spill by incorporating the floating, automatic skimmers in the boom sections which act as buffers to reduce wind, wave and current effects. This increases skimmer surface contact and efficiency. By containing a controlled spill, fluid build-up is now a positive factor. When the build-up of the spill reaches a sufficient depth up to six inches, depending on sea conditions, the skimmers will be activated. This allows a 95% to 100% spill-to-water rate of recovery. Further advantages of the present system include compressed air operation for safe, non-explosive power, boom construction from non-porous, oil-resistant, flexible, reinforced polymeric materials, and high recovery rates at high efficiency. The system provides a virtually unlimited oil spill storage capacity. When the system is completely assembled, the flexible oil storage bladders 30 are connected to the discharge lines 37 from the pumps 32. Each bladder is protected at its connection by pneumatic check valves which only open when air pressure is applied. In operation the storage bladders may be removed when full, and additional bladders can be mounted in place.

The compressed air to operate the pump motors 33 is delivered from the vessel 106 through an on board manifold. Air lines then extend from the manifold to the boom sections 22, pump motors 33 and pumps 32. The systems 20 or 20a may be deployed rapidly from a vessel by lowering it into the water, centering over an oil leak, turning on the air to form the boom array, and finally tethering the boom ends to the vessel. Once suitable build-up of the spill occurs, the pumps 32 are turned on and oil recovery begins. When the operation is complete, the fuel bladders 30 can be towed away or the collected oil can be transferred into the vessel. The apparatus can then be hoisted back upon the vessel to be cleaned and prepared for use again. The system solves spill problems heretofore considered unsolvable, due to its ability to be always ready at the potential source of trouble. The system is safe, efficient and effective beyond any known system or method heretofore proposed or in use.

The present invention creates an optimum environment for recovery of an oil spill under emergency conditions of high water turbulence. The invention employs three independent flotation means previously described. These flotation means allow for oil spill removal in the most efficient manner. They are:

1. The boom/housing is independently floated.
2. The skimmer is independently floated.
3. The skimmer's weir is independently floated.

The boom structure reduces and disperses the shock of the wave inside the boom through the use of a flexible, fluid filled boom with apertures shaped to reduce the water turbulence before or as it enters the boom. Since the boom is independently floated and water ballasted it acts as a first buffer to wave shock. The intake apertures reduce the surface wave or chop in the boom housing by slowing and diffusing the wave motion.

The skimmer hull or body is independently floated to allow its structure to float at the surface or skimming point of the fluid spill. The flexible connection of the skimmer to the collection line/housing allows the skimmers to float on the fluid surface or at the optimum skim area at all times regardless of the up and down boom motion.

The weir of the skimmer is also provided with independent flotation to allow the skimmer to skim selectively a spilled fluid surface in motion in the most efficient manner.

Following are specifications for a typical system according to the present invention capable of coping with a major oil spill from a vessel source:

Maximum recovery rate: 96,000 U.S. gallons per hour.

Maximum unattended storage: 104,000 U.S. gallons.

Length of the boom assembly: 400 feet.

Internal diameter of the boom sections: 20.00 inches.

Length of the boom sections: 40 feet each.

Boom section material: nonporous, reinforced polymer which is highly resistant to oil, ultraviolet rays, and tearing; also it is self-extinguishing in the event of fire.

Keel depth: 34 inches.

Pumps: quantity-four, Robbins Myers Moyne 2000, Model 1H115, rated at 510 gallons per minute at 443 RPM; or equivalent.

Pump Motors: 32 horsepower reciprocating air motor, one per pump.

Pump Housings: quantity - four, 12 to 20 feet in length each; inside diameter depending on pump size; material: PVC-1 or marine grade aluminum.

Skimmers: quantity - 24, Douglas Engineering/Ecoflo Model 4, automatic floating weir skimmers rated at 4000 U.S. gallons each.

Storage Tanks: quantity - four; Unitor Model 100CM, rated capacity 26,000 U.S. gallons each; towable.

It should be understood that the foregoing relates to only a preferred embodiment of the invention, which has been by way of example only, and that it is intended to cover all changes and modifications of the example of the invention herein chosen for the purposes of disclosure which do not constitute departures from the spirit and scope of the invention.

What is claimed is:

1. A rapidly deployable system for containing, collecting and storing a fluid spill occurring in a turbulent body of water having a rising and falling water surface level, comprising:

a plurality of cylindrical boom sections detachably connected end-to-end to form an elongated boom assembly for surrounding said fluid spill;

buoyant flotation members secured to said boom sections for floating the same in said water containing said fluid spill, so that said boom sections are independently buoyant and rise and fall with said water surface level, each of said boom sections having lateral apertures for admitting said water containing said spilled fluid, said apertures being so shaped that the diffuse and reduce turbulence of water entering each of said boom sections;

a plurality of independently floating skimmers disposed in spaced array axially in each of said boom sections to collect continuously said fluid spill at said rising and surface level of said water in said boom sections while said boom sections bob up and down in said turbulent body of water;

a plurality of independently floating weirs connected respectively to said skimmers and located at the rising falling surface level of said fluid spill in each boom section to pass said fluid spill continuously to said respective skimmers at all positions of said rising and falling water surface level in said boom sections;

a flexible collector pipe extending through said boom assembly and connected by flexible tubes to said skimmers to permit said skimmers to float freely and independently on said rising and falling water lever in each boom section, and to draw said spilled fluid continuously from said skimmers;

pump means connected to said collector pipe for drawing skimmed fluid therefrom continuously; and fluid storage means connected to said pump means for storing said fluid spill pumped from said collector pipe.

2. A system as claimed in claim 1, further comprising flexible, nonporous skirts secured to bottoms of said boom sections and depending therefrom in coplanar disposition to help contain within said boom assembly said fluid spill in said turbulent body of water, said skirts having weighted ballast members to increase stability of said boom sections in said turbulent body of water.

3. A system as claimed in claim 1, wherein said fluid storage means are towable, detachable, expansible and collapsible containers, for efficiently retaining said collected oil spill.

4. A system as claimed in claim 1, wherein said boom sections are collapsible after removal of said skimmers, pump means and said fluid storage means, for transport to a site of a potential oil spill, so that the system is rapidly deployable at said site by reconnecting said boom sections, skimmers, pump means and storage means, to start containing, collecting and storing a future fluid spill at said site within a few hours after said future fluid spill starts.

* * * * *